United States Patent
Kikuchi et al.

(10) Patent No.: US 12,404,415 B2
(45) Date of Patent: Sep. 2, 2025

(54) INK JET INK COMPOSITION AND RECORDING METHOD

(71) Applicant: Seiko Epson Corporation, Tokyo (JP)

(72) Inventors: Kenta Kikuchi, Suwa (JP); Hiroaki Kumeta, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 627 days.

(21) Appl. No.: 17/727,875

(22) Filed: Apr. 25, 2022

(65) Prior Publication Data

US 2022/0340772 A1    Oct. 27, 2022

(30) Foreign Application Priority Data

Apr. 26, 2021 (JP) .................. 2021-073869

(51) Int. Cl.
| | | |
|---|---|---|
| *C09D 11/328* | (2014.01) | |
| *B41J 11/00* | (2006.01) | |
| *B41M 5/00* | (2006.01) | |
| *C09D 11/037* | (2014.01) | |
| *C09D 11/38* | (2014.01) | |

(52) U.S. Cl.
CPC ....... *C09D 11/328* (2013.01); *B41J 11/00216* (2021.01); *B41M 5/0023* (2013.01); *C09D 11/037* (2013.01); *C09D 11/38* (2013.01)

(58) Field of Classification Search
None
See application file for complete search history.

(56) References Cited

U.S. PATENT DOCUMENTS

| | | | |
|---|---|---|---|
| 6,508,549 B1 * | 1/2003 | Romano, Jr. | .......... C09D 11/40 347/100 |
| 2002/0045679 A1 * | 4/2002 | Takao | .................. C09D 11/30 523/161 |
| 2009/0227785 A1 * | 9/2009 | Mayo | .................. C09B 67/0035 540/122 |
| 2013/0026416 A1 * | 1/2013 | Otsuka | ................ C08G 83/001 525/327.1 |
| 2017/0369725 A1 | 12/2017 | Mitsuyoshi et al. | |
| 2021/0170779 A1 | 6/2021 | Asakawa et al. | |

FOREIGN PATENT DOCUMENTS

| | | |
|---|---|---|
| CN | 107001835 A | 8/2017 |
| CN | 112937145 A | 6/2021 |
| EP | 0834538 A1 | 4/1998 |
| JP | 2014-028871 A | 2/2014 |
| WO | 97-040109 A1 | 10/1997 |

* cited by examiner

*Primary Examiner* — Ian A Rummel
(74) *Attorney, Agent, or Firm* — Harness, Dickey & Pierce, P.L.C.

(57) ABSTRACT

An ink jet ink composition includes a color material having a ligand; an inorganic compound; and a pH adjuster, and the color material forms a complex with the inorganic compound by the ligand.

11 Claims, No Drawings

INK JET INK COMPOSITION AND RECORDING METHOD

The present application is based on, and claims priority from JP Application Serial Number 2021-073869, filed Apr. 26, 2021, the disclosure of which is hereby incorporated by reference herein in its entirety.

BACKGROUND

1. Technical Field

The present disclosure relates to an ink jet ink composition and a recording method.

2. Related Art

Since being capable of recording a highly fine image by a relatively simple apparatus, an ink jet recording method has been rapidly developed in various fields. In particular, in order to more stably obtain a high-quality recorded matter, various studies have been carried out.

For example, JP-A-2014-28871 has disclosed a plant-extracted dyestuff liquid and a mordant liquid each of which can be stably ejected by an ink jet method. The dyestuff liquid and the mordant liquid described above are ejected and supplied to the same position of a cellulose-based substrate using an ink jet method so as to be used for dyeing by deposition, immobilization, and color development of a dye. In addition, the dyestuff liquid contains water functioning as a primary solvent, an alcohol functioning as a solvent for drying rate adjustment, and a dye molecule extracted from a natural product and has a surface tension of 20 to 75 mN/m and a viscosity of 0.5 to 40 mPa·s. In addition, the mordant liquid contains a polyvalent metal ion to form a complex with the dye molecule extracted from a natural product, water functioning as a primary solvent, and an alcohol functioning as a solvent used for drying rate adjustment and has a surface tension of 20 to 75 mN/m and a viscosity of 0.5 to 40 mPa·s.

However, the dyestuff liquid and the mordant liquid disclosed in JP-A-2014-28871 are complicated since being separated from each other. Accordingly, without using the structure in which the dyestuff liquid and the mordant liquid are separately prepared, an ink jet ink composition having an excellent color development property and a preferable ejection stability has been pursued.

SUMMARY

Through intensive research carried out by the present inventors to solve the problem described above, it was found that by using an ink jet ink composition which contains a color material having a ligand, an inorganic compound, and a pH adjuster and in which the color material forms a complex with the inorganic compound by the ligand described above, the problem described above is solved, and in addition, various characteristics of the ink composition used for recording by an ink jet method are excellent. Accordingly, the present disclosure was completed.

That is, according to an aspect of the present disclosure, there is provided an ink jet ink composition comprising: a color material having a ligand; an inorganic compound; and a pH adjuster, and the color material forms a complex with the inorganic compound by the ligand.

DESCRIPTION OF EXEMPLARY EMBODIMENTS

Hereinafter, an embodiment (hereinafter, referred to as "this embodiment") to perform the present disclosure will be described in detail. The following embodiment is an example to describe the present disclosure and is not intended to limit the present disclosure to the following contents. The present disclosure may be performed after being appropriately changed and/or modified without departing from the scope thereof.

Ink Jet Ink Composition

An ink jet ink composition (hereinafter, simply referred to as the "ink composition" in some cases) according to this embodiment comprises: a color material having a ligand; an inorganic compound; and a pH adjuster. In addition, the color material forms a complex with the inorganic compound by the ligand described above. The reasons the ink composition of this embodiment is excellent in various characteristics of an ink composition to be recorded by an ink jet method are believed as described below. However, the reasons are not limited thereto. That is, in particular, when a related ink composition contains a natural dye as a color material, because of an insufficient stability of a chemical structure thereof, a color development property of a recorded matter to be obtained may not be sufficiently obtained in some cases. In addition, an excellent ejection stability may not be obtained in some cases. On the other hand, according to the ink composition of this embodiment, since the ligand contained in the color material is coordinated to the inorganic compound to form the complex, and the chemical structure of the color material is stabilized, an ink composition which forms a recorded matter having an excellent color development property can be obtained. Furthermore, since the chemical structure of the color material is stable, the ink composition of this embodiment is excellent in reliability besides the color development property described above and is also excellent in ejection stability.

In this specification, the "ink jet ink composition" indicates an ink composition to be recorded (printed) on a recording medium using an ink jet method. The "recorded matter" indicates a matter to be formed such that an image is formed by recording an ink composition on a recording medium.

Color Material Having Ligand

The ink composition of this embodiment contains a color material having a ligand. In this specification, the "color material having a ligand" indicates a color material which forms a complex with an inorganic compound by the ligand and which imparts the color development property to the recorded matter.

Although the type of color material having a ligand is not particularly limited, for example, a color material derived from a natural product and a chemically synthesized color material may be mentioned. Although the color material of this embodiment may be appropriately selected and used from various types of color materials each having a ligand mentioned above, the color material derived from a natural product is preferably contained.

Although the color material derived from a natural product is not particularly limited, for example, there may be mentioned an anthraquinone-based color material, such as cochineal (carminic acid, ligand: OH (hydroxo), C=O (carbonyl)) or lac (laccaic acid, ligand: OH (hydroxo), C=O (carbonyl)); a flavonoid-based compound such as carthamus red (carthamin, ligand: OH (hydroxo), C=O (carbonyl)); an iridoid glycoside such as gardenia red; an anthocyanin-based color material, such as grape skin (malvidin-3-glucoside, ligand: OH (hydroxo), $OCH_3$ (methoxy)), butterfly pea (pelargonidin, cyanidin, delphinidin, ligand: OH (hydroxo), O (oxocation)); or a turmeric-based color material such as curcumin (ligand: OH (hydroxo), $OCH_3$ (methoxy), C=O (carbonyl)). Among those mentioned above, cochineal or curcumin is preferable.

The color material having a ligand may be used alone, or at least two types thereof may be used in combination. A content of the color material having a ligand with respect to the total mass of the ink composition is preferably 1.0 to 15 percent by mass, more preferably 2.0 to 10.0 percent by mass, and further preferably 3.0 to 8.0 percent by mass. Since the content of the color material having a ligand is in the range described above, the color development property of the recorded matter is excellent, and the ejection stability tends to be further improved.

The ink composition of this embodiment may contain at least one color material (such as a pigment and/or a dyestuff) other than the color material having a ligand.

Since containing the color material which forms a complex with the inorganic compound by the ligand, the ink composition of this embodiment has an excellent color development property which can be applied to various types of inks, such as a white ink, a black ink, a yellow ink, a magenta ink, and a cyan ink and which can be further applied to specific inks, such as a violet ink, a brown ink, an orange ink, a red ink, and a green ink.

Inorganic Compound

The ink composition of this embodiment contains an inorganic compound to form a complex with the ligand of the color material. In this specification, the "inorganic compound" indicates a compound containing a metal.

Although the type of inorganic compound is not particularly limited, for example, a salt which is ionized in water to form a metal ion or an ion containing a metal may be mentioned. Although the inorganic compound of this embodiment may be appropriately selected and used from various types of inorganic compounds each forming a complex with the ligand of the color material, in the ink composition, the inorganic compound preferably contains a metal-containing oxonium ion or a metal ion.

As the metal described above, for example, there may be mentioned a metal of Group VIII such as iron, a metal of Group XI such as copper, silver, or gold; a metal of Group XIII such as aluminum; a metal of Group XIV such as tin or lead. When the metal is a metal of Group XIII or XIV, the inorganic compound preferably includes sodium stannate or aluminium potassium sulfate. In addition, when the metal is a metal of Group VIII or XI, the inorganic compound preferably includes copper (II) sulfate or iron (II) sulfate.

The inorganic compound may be used alone, or at least two types thereof may be used in combination. A content of the inorganic compound with respect to the total mass of the ink composition is preferably 0.001 to 5.0 percent by mass, more preferably 0.01 to 1.0 percent by mass, and further preferably 0.05 to 0.2 percent by mass. Since the content of the inorganic compound is in the range described above, the color development property of the recorded matter is excellent, and the ejection stability tends to be further improved.

A ratio (color material/inorganic compound) of the color material having a ligand to the inorganic compound on a mass basis is preferably 5 to 200, more preferably 20 to 120, and further preferably 40 to 80. Since the ratio described above is in the range described above, the color development property of the recorded matter is excellent, and the ejection stability tends to be further improved.

pH Adjuster

The ink composition of this embodiment contains a pH adjuster to adjust the pH of the ink composition. Since the pH adjuster is contained, the formation of the complex between the ligand of the color material and the inorganic compound is promoted, the color development property of the recorded matter is excellent, and the ejection stability is further improved.

Although the type of pH adjuster is not particularly limited, for example, an acid, such as citric acid or acetic acid, or a base such as triethanolamine may be mentioned. The pH adjuster of this embodiment may be appropriately selected and used from various types of pH adjusters mentioned above each of which promotes the formation of the complex between the ligand of the color material and the inorganic compound.

When the metal of the above inorganic compound is a metal of Group XIII or Group XIV, the pH adjuster preferably includes triethanolamine or citric acid. In addition, when the metal of the above inorganic compound is a metal of Group VIII or Group XI, the pH adjuster preferably includes acetic acid.

Although the pH of the ink composition is not particularly limited, when the metal of the above inorganic compound is a metal of Group XIII or Group XIV, the pH described above is preferably 6.0 to 10.0, more preferably 6.5 to 9.5, and further preferably 7.0 to 9.0. In addition, when the metal of the above inorganic compound is a metal of Group VIII or Group XI, the pH of the ink composition is preferably 3.0 to 7.0, more preferably 3.5 to 6.0, and further preferably 4.0 to 5.0. Since the pH of the ink composition is in the range described above, the color development property of the recorded matter is excellent, and the ejection stability tends to be further improved.

Water-Soluble Organic Solvent

The ink composition of this embodiment preferably contains a water-soluble organic solvent. In this specification, a "water-soluble" compound indicates a compound which is usable with water and which has a property to be at least partially dissolved in water.

Although the type of water-soluble organic solvent is not particularly limited, for example, a monoalcohol, an alkylpolyol, a glycol ether, a cyclic nitrogen compound, or an aprotic polar solvent may be mentioned. Although the organic solvent of this embodiment may be appropriately selected and used from various types of water-soluble organic solvents among the organic solvents mentioned above, the alkylpolyol is preferably contained.

Although the monoalcohol is not particularly limited, for example, there may be mentioned methanol, ethanol, n-propyl alcohol, iso-propyl alcohol, n-butanol, 2-butanol, tert-butanol, iso-butanol, n-pentanol, 2-pentanol, 3-pentanol, or tert-pentanol.

Although the alkylpolyol is not particularly limited, for example, there may be mentioned glycerin, ethylene glycol, diethylene glycol, triethylene glycol, a polyethylene glycol, propylene glycol (1,2-propanediol), dipropylene glycol, 1,3-propylene glycol (1,3-propanediol), isobutylene glycol (2-methyl-1,2-propanediol), 1,2-butanediol, 1,3-butylene glycol (1,3-butanediol), 1,4-butanediol, 2-butene-1,4-diol, 1,2-pentanediol, 1,5-pentanediol, 2-methyl-2,4-pentanediol, 1,2-hexanediol, 1,6-hexanediol, 2-ethyl-1,3-hexanediol, 1,7-heptanediol, or 1,8-octanediol. Among those mentioned above, glycerin or 1,3-butyelen glycol is preferable.

Although the glycol ether is not particularly limited, for example, there may be mentioned diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, or dipropylene glycol mono-iso-propyl ether.

Although the aprotic polar solvent is not particularly limited, for example, there may be mentioned cyclic ketone compound, a chain ketone compound, or a chain nitrogen compound. In addition, as the cyclic nitrogen compound and the aprotic polar solvent, a solvent, such as a pyrrolidone, an imidazolidinone, a sulfoxide, a lactone, an amide ether, or an imidazole, may be mentioned as a typical example. Although the pyrrolidone is not particularly limited as long as having a pyrrolidone skeleton, for example, there may be mentioned 2-pyrrolidone, an N-alkyl-2-pyrrolidone, or a 1-alkyl-2-pyrrolidone. As the imidazolidinone, for example, 1,3-dimethyl-2-imidazolidinone may be mentioned; as the sulfoxide, for example, dimethylsulfoxide may be mentioned; as the lactone, for example, γ-butyrolactone may be mentioned; and as the imidazole, for example, imidazole, 1-methylimidazole, 2-methylimidazole, or 1,2-dimethylimidazole may be mentioned.

The water-soluble organic solvent may be used alone, or at least two types thereof may be used in combination. A content of the water-soluble organic solvent with respect to the total mass of the ink composition is preferably 1.0 to 70 percent by mass, more preferably 5.0 to 50 percent by mass, and further preferably 10 to 30 percent by mass. Since the content of the water-soluble organic solvent is in the range described above, the ejection stability tends to be further improved.

Surfactant

The ink composition of this embodiment preferably contains a surfactant. In this specification, the "surfactant" indicates an agent to promote permeation of the ink composition into a recording medium.

Although the surfactant is not particularly limited, for example, an acetylene glycol-based surfactant, an alkyl ether-based surfactant, a fluorine-based surfactant, or a silicone-based surfactant may be mentioned.

Although the acetylene glycol-based surfactant is not particularly limited, for example, at least one selected from 2,4,7,9-tetramethyl-5-decyne-4,7-diol, an alkylene oxide adduct thereof, 2,4-dimethyl-5-decyne-4-ol, and an alkylene oxide adduct thereof is preferable. Although a commercially available product of the acetylene glycol-based surfactant is not particularly limited, for example, there may be mentioned Olfine E1010, PD-002W, PD-005, EXP4200, EXP4300, or WE-003 (trade name, manufactured by Nisshin Chemical Industry Co., Ltd.); or Surfynol 104E, 104PG50, 420, 465, 485, 61, 82, DF110D, DF37, DF75, or MD-20 (trade name, manufactured by Evonik Industries AG).

Although the alkyl ether-based surfactant is not particularly limited, for example, at least one selected from a polyoxyethylene 2-ethylhexyl ether, a polyoxyethylene oleyl ether, a polyoxyethylene tridecyl ether, a polyoxyethylene castor oil ether, a polyoxyethylene cetyl ether, a polyoxyethylene stearyl ether, a polyoxyethylene alkyl ether, and a polyoxyalkylene tridecyl ether is preferable. Although a commercially available product of the alkyl ether-based surfactant is not particularly limited, for example, there may be mentioned Newcol 1006, 1008, or 1020 (trade name, manufactured by Nippon Nyukazai Co., Ltd.); Noigen DL-0415, ET-116B, ET-106A, DH-0300, YX-400, or EA-160 (trade name, manufactured by DKS Co., Ltd.); or Emulgen 430 or 1108 (trade name, manufactured by Kao Corporation).

Although the fluorine-based surfactant is not particularly limited, for example, there may be mentioned a perfluoroalkyl sulfonate salt, a perfluoroalkyl carboxylate salt, a perfluoroalkyl phosphate ester, a perfluoroalkyl ethylene oxide adduct, a perfluoroalkyl alkyl betaine, or a perfluoroalkyl amine oxide compound. Although a commercially available product of the fluorine-based surfactant is not particularly limited, for example, there may be mentioned S-144 or S-145 (trade name, manufactured by Asahi Glass Co., Ltd.); FC-170C, FC-430, or Florade FC4430 (trade name, manufactured by Sumitomo 3M Limited); FSO, FSO-100, FSN, FSN-100, or FS-300 (trade name, manufactured by du Pont); or FT-250 or 251 (trade name, manufactured by Neos Co., Ltd.).

Although the silicone-based surfactant is not particularly limited, for example, a polysiloxane-based compound or a polyether modified organosiloxane may be mentioned. Although a commercially available product of the silicone-based surfactant is not particularly limited, in particular, for example, there may be mentioned SAG503A (trade name, manufactured by Nisshin Chemical Industry Co., Ltd.); BYK-306, BYK-307, BYK-333, BYK-341, BYK-345, BYK-346, BYK-347, BYK-348, or BYK-349 (trade name, manufactured by BYK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.).

Among those surfactants mentioned above, the acetylene glycol-based surfactant is preferable.

The surfactant may be used alone, or at least two types thereof may be used in combination. A content of the surfactant with respect to the total mass of the ink composition is preferably 0.05 to 2.5 percent by mass, more preferably 0.1 to 1.5 percent by mass, and further preferably 0.3 to 1.0 percent by mass. Since the content of the surfactant is in the range described above, the ejection stability tends to be further improved.

Water

The ink composition of this embodiment contains water. As the water, for example, there may be mentioned pure water, such as ion exchange water, ultrafiltration water, reverse osmosis water, or distilled water, or water, such as ultrapure water, in which ionic impurities are removed as much as possible. In addition, in the case in which water sterilized by UV radiation or addition of hydrogen peroxide is used, generation of fungi and bacteria can be suppressed when the ink composition is stored for a long time. As a result, a storage stability of the ink composition tends to be further improved.

A content of the water with respect to the total mass of the ink composition is preferably 10 to 95 percent by mass, more preferably 40 to 90 percent by mass, and further preferably 60 to 85 percent by mass. Since the content of the water is in the range described above, the ejection stability tends to be further improved.

The ink composition of this embodiment may also appropriately contain, besides the components described above, various additives, such as a dispersant for the color material, resin particles, a solubilizing agent, a viscosity adjuster, an antioxidant, a fungicide/antiseptic agent, an antifungal agent, and/or a corrosion inhibitor.

Recording Method

A recording method of this embodiment includes a step (hereinafter, referred to as the "adhesion step") of adhering the ink composition described above to a recording medium. In the adhesion step, in more particular, the ink composition is ejected on a recording medium by an ink jet method, so that a recorded matter is obtained. As this recording medium, for example, an absorbing recording medium or a non-absorbing recording medium may be mentioned. Although the recording method of this embodiment may be widely applied to recording media having various absorbing characteristics, such as a non-absorbing recording medium into which a water-soluble ink composition is difficult to permeate and an absorbing recording medium into which a water-soluble ink composition is easy to permeate, the recording method of this embodiment is preferably applied to an absorbing recording medium.

As the absorbing recording medium, there may be mentioned various types of recording media including from regular paper, such as electrophotographic paper, having a high liquid permeability and ink jet paper (ink jet exclusive paper having an ink absorbing layer formed from silica particles or aluminum particles or having an ink absorbing layer formed from a hydrophilic polymer, such as a poly(vinyl alcohol) (PVA) or a poly(vinyl pyrrolidone) (PVP)) to art paper, coated paper, and cast paper, each of which has a relatively low ink permeability and is used for general offset printing.

As the non-absorbing recording medium, in particular, for example, there may be mentioned a film or a plate of a plastic, such as a poly(vinyl chloride), a polyethylene, a polypropylene, or a poly(ethylene terephthalate) (PET); a plate of a metal, such as iron, silver, copper, or aluminum; a metal plate or a plastic film formed by deposition of at least one of the above various metals; or a plate of an alloy, such as stainless steel or brass.

In this embodiment, in order to promote drying of the ink composition, a heating step of heating the recording medium may be performed at least one time before, during, and/or after the recording. A heating device is not particularly limited as long as having a temperature control system, and for example, a method using a radiation heating type sheath heater or infrared heater, a contact heating type sheet heater, an electromagnetic wave, or the like may be mentioned. A heating temperature is preferably 40° C. to 80° C. as a surface temperature of the recording medium. Furthermore, a ventilation step by a fan or the like may also be performed.

The recording method of this embodiment may also include, besides the steps described above, at least one known step of a related ink jet recording method.

EXAMPLES

Hereinafter, although the present disclosure will be described in detail with reference to Examples and Comparative Examples, the present disclosure is not limited at all to the following Examples and Comparative Examples as long as not departing from the scope of the present disclosure.

Materials used for the ink compositions in the following Examples and Comparative Examples are as shown below.

Color Material

Cochineal (natural dye, ligand: OH (hydroxo), C=O (carbonyl), manufactured by Kiriya Chemical Co., Ltd., "Carmine Red DX")

Curcumin (natural dye, ligand: OH (hydroxo), $OCH_3$ (methoxy), C=O (carbonyl), manufactured by Kiriya Chemical Co., Ltd., curcumin base powder, abbreviated as "CURCUMIN" in the table)

Monascus Red (natural dye, no ligand, manufactured by Kiriya Chemical Co., Ltd., "Monascus Red AL")

Yellow No. 4 (synthetic dye, no ligand, manufactured by Kiriya Chemical Co., Ltd.)

Inorganic Compound

Sodium stannate (oxonium ion containing metal of Group XIV, sodium stannate trihydrate, CAS RN: 12209-98-2, manufactured by FUJIFILM Wako Pure Chemical Corporation, represented by "Na STANNATE" in the table)

Aluminium potassium sulfate (metal cation containing metal of Group XIII, aluminium potassium sulfate dodecahydrate, CAS RN: 7784-24-9, manufactured by FUJIFILM Wako Pure Chemical Corporation, represented by "KAl SULFATE" in the table)

Copper (II) sulfate (metal cation of Group XI, copper (II) sulfate pentahydrate, CAS RN: 7758-99-8, manufactured by FUJIFILM Wako Pure Chemical Corporation)

Iron (II) sulfate (metal cation of Group VIII, iron (II) sulfate heptahydrate, CAS RN: 7782-63-0, manufactured by FUJIFILM Wako Pure Chemical Corporation)

pH Adjuster

Triethanolamine (abbreviated as "TEA" in the table)

Citric acid buffer solution (citric acid-sodium citrate, abbreviated as "CITRIC ACID" in the table)

Acetic acid buffer solution (acetic acid-sodium acetate, abbreviated as "ACETIC ACID" in the table)

Water-Soluble Organic Solvent

Glycerin 1,3-butylene glycol

Surfactant

Olfine E1010 (trade name, manufactured by Air Products and Chemicals Inc.)

Water

Pure water

Preparation of Ink Composition

The individual materials were mixed to form the compositions shown in the following Table 1 and were then sufficiently stirred, so that the ink compositions were obtained. In addition, in the following Table 1, the numerical value represents a solid content, the unit thereof represents percent by mass, and the total represents 100.0 percent by mass.

TABLE 1

| | | COLOR MATERIAL | | INORGANIC COMPOUND | | pH ADJUSTER | |
|---|---|---|---|---|---|---|---|
| | | TYPE | CONTENT | TYPE | CONTENT | TYPE | CONTENT |
| EXAMPLE | 1 | COCHINEAL | 5.0 | Na STANNATE | 0.08 | TEA | 1.0 |
| | 2 | COCHINEAL | 5.0 | Na STANNATE | 0.08 | CITRIC ACID | 1.0 |

TABLE 1-continued

| | | | | | | | |
|---|---|---|---|---|---|---|---|
| | 3 | COCHINEAL | 5.0 | Na STANNATE | 0.08 | ACETIC ACID | 1.0 |
| | 4 | COCHINEAL | 5.0 | KAl SULFATE | 0.08 | TEA | 1.0 |
| | 5 | COCHINEAL | 5.0 | COPPER (II) SULFATE | 0.08 | ACETIC ACID | 1.0 |
| | 6 | CURCUMIN | 5.0 | Na STANNATE | 0.08 | TEA | 1.0 |
| | 7 | CURCUMIN | 5.0 | KAl SULFATE | 0.08 | CITRIC ACID | 1.0 |
| | 8 | CURCUMIN | 5.0 | IRON (II) SULFATE | 0.08 | ACETIC ACID | 1.0 |
| | 9 | COCHINEAL | 5.0 | Na STANNATE | 0.2 | TEA | 1.0 |
| | 10 | COCHINEAL | 5.0 | Na STANNATE | 0.043 | TEA | 1.0 |
| | 11 | COCHINEAL | 5.0 | Na STANNATE | 1.0 | TEA | 1.0 |
| | 12 | COCHINEAL | 5.0 | Na STANNATE | 0.037 | TEA | 1.0 |
| | 13 | COCHINEAL | 5.0 | COPPER (II) SULFATE | 0.08 | TEA | 1.0 |
| | 14 | COCHINEAL | 5.0 | IRON (II) SULFATE | 0.08 | TEA | 1.0 |
| COMPARATIVE EXAMPLE | 1 | MONASCUS RED | 5.0 | Na STANNATE | 0.08 | TEA | 1.0 |
| | 2 | YELLOW NO. 4 | 5.0 | KAl SULFATE | 0.08 | TEA | 1.0 |
| | 3 | COCHINEAL | 5.0 | — | — | TEA | 1.0 |
| | 4 | COCHINEAL | 5.0 | — | — | CITRIC ACID | 1.0 |
| | 5 | COCHINEAL | 5.0 | — | — | ACETIC ACID | 1.0 |
| | 6 | COCHINEAL | 5.0 | Na STANNATE | 0.08 | — | — |
| | 7 | CURCUMIN | 5.0 | IRON (II) SULFATE | 0.08 | — | — |

| | | WATER-SOLUBLE ORGANIC SOLVENT | | SURFACTANT | | COLOR MATERIAL/ | |
|---|---|---|---|---|---|---|---|
| | | GLYCERIN | 1,3-BUTYLENE GLYCOL | OLFINE E1010 | WATER | INORGANIC COMPOUND | pH OF INK |
| EXAMPLE | 1 | 10 | 3.0 | 0.5 | BALANCE | 63 | 8.5 |
| | 2 | 10 | 3.0 | 0.5 | BALANCE | 63 | 7.0 |
| | 3 | 10 | 3.0 | 0.5 | BALANCE | 63 | 4.5 |
| | 4 | 10 | 3.0 | 0.5 | BALANCE | 63 | 8.5 |
| | 5 | 10 | 3.0 | 0.5 | BALANCE | 63 | 4.5 |
| | 6 | 10 | 3.0 | 0.5 | BALANCE | 63 | 8.5 |
| | 7 | 10 | 3.0 | 0.5 | BALANCE | 63 | 7.0 |
| | 8 | 10 | 3.0 | 0.5 | BALANCE | 63 | 4.5 |
| | 9 | 10 | 3.0 | 0.5 | BALANCE | 25 | 8.5 |
| | 10 | 10 | 3.0 | 0.5 | BALANCE | 116 | 8.5 |
| | 11 | 10 | 3.0 | 0.5 | BALANCE | 5.0 | 8.5 |
| | 12 | 10 | 3.0 | 0.5 | BALANCE | 135 | 8.5 |
| | 13 | 10 | 3.0 | 0.5 | BALANCE | 63 | 8.5 |
| | 14 | 10 | 3.0 | 0.5 | BALANCE | 63 | 8.5 |
| COMPARATIVE EXAMPLE | 1 | 10 | 3.0 | 0.5 | BALANCE | 63 | 8.5 |
| | 2 | 10 | 3.0 | 0.5 | BALANCE | 63 | 8.5 |
| | 3 | 10 | 3.0 | 0.5 | BALANCE | — | 8.5 |
| | 4 | 10 | 3.0 | 0.5 | BALANCE | — | 7.0 |
| | 5 | 10 | 3.0 | 0.5 | BALANCE | — | 4.5 |
| | 6 | 10 | 3.0 | 0.5 | BALANCE | 63 | 6.0 |
| | 7 | 10 | 3.0 | 0.5 | BALANCE | 63 | 9.0 |

Color Development Property (Abs.)

Each ink composition was diluted with water to have a color material concentration of 0.001% and was then measured in a range of 400 to 800 nm by a spectrophotometer ("U-39000H", manufactured by Hitachi Hi-Tech Science Corporation). From an absorption value (Abs.) at the maximum absorption wavelength in the range of 400 to 800 nm, the color development property (Abs.) was evaluated by the following evaluation criteria.

Evaluation Criteria
A: Abs. of 0.8 or more
B: Abs. of 0.6 to less than 0.8
C: Abs. of 0.4 to less than 0.6
D: Abs. of less than 0.4

Color Development Property (OD)

By using an ink jet recording apparatus ("PX-S840", manufactured by Seiko Epson Corporation), each ink composition was filled in an ink cartridge of this ink jet recording apparatus and was then printed on plain-woven cotton to form a solid pattern at a duty of 100% in an A4 size. By using a colorimeter (fluorescent spectrodensitometer, "FD-7", manufactured by Konica Minolta, Inc.), the optical density (OD) of a printed matter was measured, and the color development property (OD) thereof was evaluated by the following criteria.

Evaluation Criteria
A: OD of 1.0 or more
B: OD of 0.8 to less than 1.0
C: OD of 0.6 to less than 0.8
D: OD of less than 0.6

Ejection Stability

By using an ink jet recording apparatus ("PX-S840", manufactured by Seiko Epson Corporation), each ink composition was filled in an ink cartridge of this ink jet recording apparatus and was then continuously printed on 50 sheets of regular paper to form a solid pattern at a duty of 100% in an A4 size. After the printing was performed, from the number of missing nozzles among the nozzles which ejected the ink composition, the ejection stability was evaluated by the following criteria.

Evaluation Criteria

AA: Number of missing nozzles is less than 5.
A: Number of missing nozzles is 5 to less than 10.
B: Number of missing nozzles is 10 to less than 20.
C: Number of missing nozzles is 20 to less than 30.
D: Number of missing nozzles is 30 or more.

TABLE 2

|  |  | COLOR DEVELOPMENT PROPERTY (Abs.) | COLOR DEVELOPMENT PROPERTY (OD) | EJECTION STABILITY |
|---|---|---|---|---|
| EXAMPLE | 1 | A | A | AA |
|  | 2 | A | A | AA |
|  | 3 | A | A | A |
|  | 4 | A | A | A |
|  | 5 | A | A | B |
|  | 6 | A | A | A |
|  | 7 | A | A | A |
|  | 8 | B | A | B |
|  | 9 | A | A | A |
|  | 10 | A | A | AA |
|  | 11 | A | A | B |
|  | 12 | B | B | AA |
|  | 13 | B | B | B |
|  | 14 | B | B | B |
| COMPARATIVE EXAMPLE | 1 | C | C | A |
|  | 2 | B | B | D |
|  | 3 | C | C | B |
|  | 4 | D | D | B |
|  | 5 | D | D | B |
|  | 6 | C | C | A |
|  | 7 | C | C | D |

What is claimed is:

1. An ink jet ink composition comprising:
a color material having a ligand, the color material being derived from a natural product;
an inorganic compound; and
a pH adjuster,
wherein the color material forms a complex with the inorganic compound by the ligand,
wherein the inorganic compound contains a metal-containing oxonium ion or a metal ion,
wherein the ink jet ink composition is a white ink, a black ink, a yellow ink, a magenta ink, a cyan ink, a violet ink, a brown ink, an orange ink, or a green ink, and
wherein the color material includes cochineal or curcumin.

2. The ink jet ink composition according to claim 1, wherein the inorganic compound contains a metal ion.

3. The ink jet ink composition according to claim 1, wherein a content ratio (color material/inorganic compound) of the color material to the inorganic compound is 20 to 120 on a mass basis.

4. The ink jet ink composition according to claim 1, wherein the inorganic compound contains a metal of Group XIII or Group XIV.

5. The ink jet ink composition according to claim 4, wherein the inorganic compound includes sodium stannate or aluminium potassium sulfate.

6. The ink jet ink composition according to claim 4, wherein the pH adjuster includes triethanolamine or citric acid.

7. The ink jet ink composition according to claim 4, wherein the ink jet ink composition has a pH of 6.5 to 9.5.

8. The ink jet ink composition according to claim 1, wherein the inorganic compound contains a metal of Group VIII or Group XI, and
the pH adjuster includes acetic acid.

9. The ink jet ink composition according to claim 8, wherein the inorganic compound includes copper (II) sulfate or iron (II) sulfate.

10. The ink jet ink composition according to claim 8, wherein the ink jet ink composition has a pH of 4.0 to 5.0.

11. A recording method comprising:
an adhesion step of adhering the ink jet ink composition according to claim 1 to a recording medium.

* * * * *